United States Patent [19]

Geisseler

[11] Patent Number: 4,731,280
[45] Date of Patent: Mar. 15, 1988

[54] RIBBED ARTICLE AND METHOD OF MAKING A RIBBED ARTICLE

[75] Inventor: Max Geisseler, Ettenhausen, Switzerland

[73] Assignee: Sulzer Brothers Limited, Winterthur, Switzerland

[21] Appl. No.: 944,254

[22] Filed: Dec. 18, 1986

[30] Foreign Application Priority Data

Dec. 23, 1985 [CH] Switzerland .......................... 5487/85

[51] Int. Cl.$^4$ .......................... B32B 3/28; B32B 3/30; B32B 1/00; B32B 3/00
[52] U.S. Cl. .................................. 428/163; 428/167; 428/169; 428/174; 428/179
[58] Field of Search ............... 428/163, 167, 169, 174, 428/179

[56] References Cited

U.S. PATENT DOCUMENTS

| | | | |
|---|---|---|---|
| 3,642,967 | 2/1972 | Doll | 428/174 X |
| 3,953,633 | 4/1976 | Noonan | 428/167 X |
| 4,147,822 | 4/1979 | Kallmeyer et al. | 428/167 X |
| 4,348,441 | 9/1982 | Kato | 428/174 X |
| 4,435,463 | 3/1984 | Roellchen | 428/174 X |
| 4,478,899 | 10/1984 | Mayumi et al. | 428/167 X |

*Primary Examiner*—George F. Lesmes
*Assistant Examiner*—D. R. Zirker
*Attorney, Agent, or Firm*—Kenyon & Kenyon

[57] ABSTRACT

The ribbed article has ribs which are built-up of multi-layer ribs. In the crossing points or overlap zones, some of the weld seams of one rib are continuous or discontinuous while the weld seams of the crossing rib are discontinuous or continuous as the case may be. The overall height of the overlap zone is the same as the ribs forming the overlap zone. A pair of guide beads are also applied to the base member prior to application of the first weld layer of a rib in order to guide the build-up of a rib.

4 Claims, 8 Drawing Figures

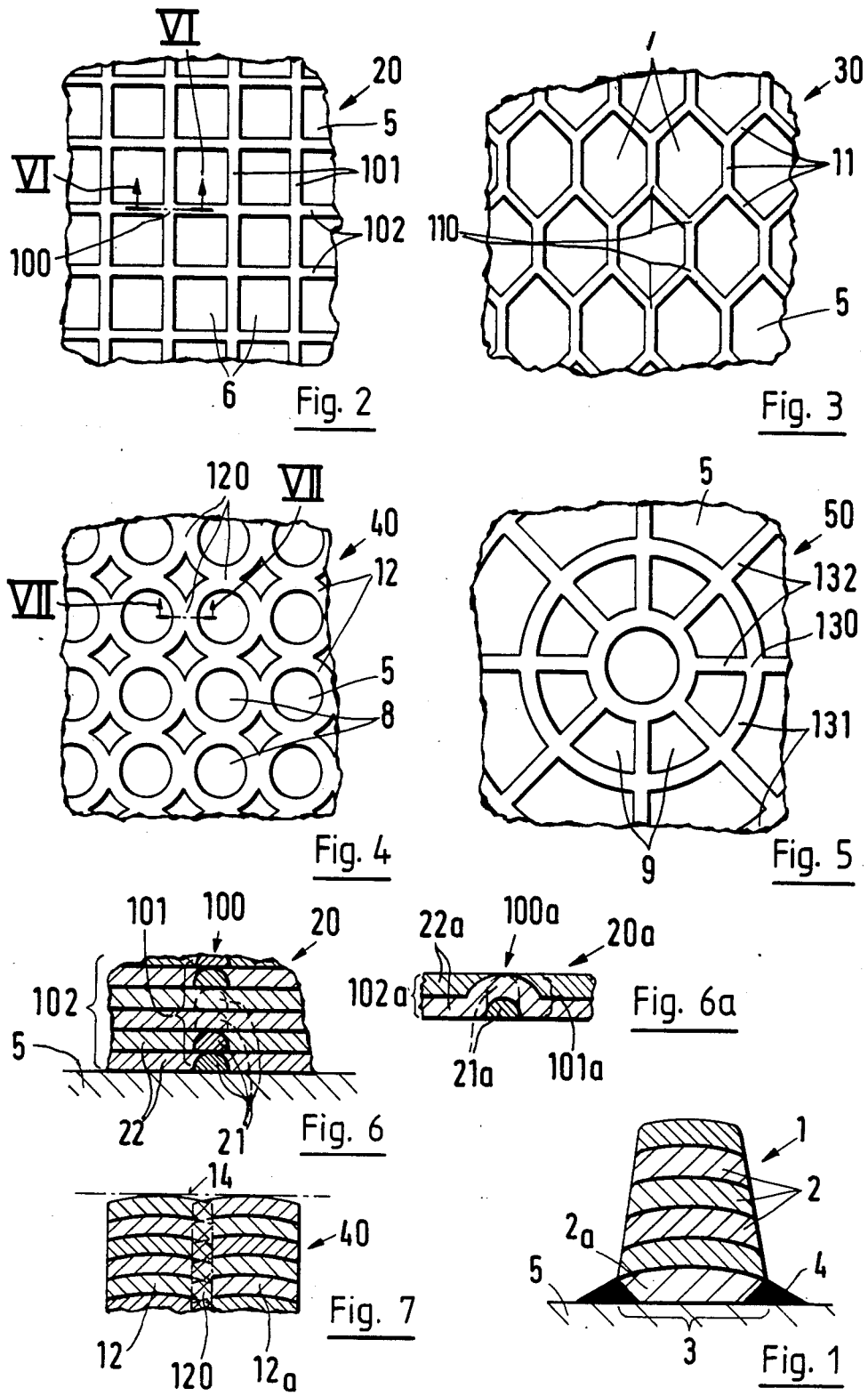

RIBBED ARTICLE AND METHOD OF MAKING A RIBBED ARTICLE

This invention relates to a ribbed article and to a method of making a ribbed article.

As is known, various types of articles such as large flat and relatively thin articles are frequently provided with some type of strengthening in order to resist stresses. For example, if a large flat and relatively thin article is subjected to high temperatures as well as high mechanical stressing, such as in the case with a mirror support plate of a solar collector for solar power plant or with a large component of a chemical reactor, the stengthening has been in the form of ribs. In many cases, the ribs have been formed of built-up welding. However, the strengthening ribs must be provided without inhomogeneities. Heretofore, the only way of achieving this, if at all, has been by means of a very expensive heat treatment after the build-up or face welding of the ribs. Furthermore, contact between the ribs has usually been avoided at the various crossing points since manufacture otherwise becomes expensive and the resulting strength properties have not usually been satisfactory.

Accordingly, it is an object of the invention to provide a ribbed article which is of relatively simple construction.

It is another object of the invention to provide a ribbed article which can be made relatively inexpensively but is very strong with few inhomogeneities.

It is another object of the invention to provide a relatively simple technique for forming built-up ribs on a base member.

Briefly, the invention provides a ribbed article which is comprised of a base member and a plurality of ribs which are disposed on the base member with at least two of the ribs disposed in overlapping relation in an overlap zone and formed of an equal number of multiple layers of weld seams. In accordance with the invention, at least one weld seam in one of the two overlapped ribs extends continuously through the overlap zone while at least one weld seam in the second of the two ribs is interrupted in the overlap zone. In this way, the overlap zon can be made of equal height to the remainder of the ribs relative to the base member.

The relationship of the various weld seams in the overlapped ribs is such that they virtually mesh with one another like toothing. Thus, very high strengths are provided. Further, the inherent advantage of built-up welding is fully utilized. That is, during production, the overlapping weld seam provides the heat treatment of the overlapped weld seam, as it were, automatically. As a result, inhomogeneities are virtually precluded.

Further, during production of the ribbed article, the ribs grow substantially uniformly layer by layer and become unitary with one another.

In one embodiment, the ribs may be disposed in crossing relation to each other in a grid-like manner in order to define recesses of straight prismatic shape.

In another embodiment, the ribs may be uniformly disposed on the base member to define recesses of cylindrical shape.

In another embodiment, some of the ribs may be of circular shape to define concentrically disposed recesses while the remaining ribs are radially disposed relative to the circular ribs in an overlapping relation.

The invention also provides a method of forming ribs of built-up welding on a base member. In accordance with this method, a pair of parallel guide beads are formed on the base member for each rib to be formed on a base member at a spacing from each other equal to the base width of the rib to be formed. Thereafter, a plurality of overlying weld seams are applied between the guide beads in order to form a multilayer rib. The use of the guide beads enhances the maintenance of the rib shape during production and the general strength of the article.

In accordance with the method, a crossing pattern of multi-layer ribs are formed on the base member. In this respect, at least one weld seam of one rib is applied continuously in one overlap zone with a second rib while at least one weld seam of the second rib is applied discontinuously in the overlap zone. Tests on specimens have shown that it is readily possible with conventional welding facilities to interrupt one of the weld seams shortly before the seam of another rib is reached and to continue the weld seam immediately after passing by the other weld seam. Thus, the interconnected finished ribs in the overlap zone may be formed with the same number of weld layers and of the same rib height.

In the embodiment where the ribs are formed of a crossing pattern of circular ribs and radially disposed ribs the ribs may be applied in a manner to ensure uniform temperature distribution during production. Specifically, an annular weld seam may be applied to the base member for forming the outermost annular ribs. Thereafter, a series of annular weld seams are applied to the base member for forming a sequence of annular ribs within the outer annular rib. Thereafter, a series of weld seams are applied radially of the annular weld seams and in overlapping relation at respective overlap zones so that one weld seam is continuous in the zone and the other is discontinuous. Subsequent layers of weld seams are then applied in a similar sequence to form multilayer ribs of equal height relative to the base member.

These and other objects and advantages of the invention will become more apparent form the following detailed description taken in conjunction with the accompany drawings wherein:

FIG. 1 illustrates a cross sectional view of a multilayer rib constructed in accordance with the invention;

FIG. 2 illustrates a crossing pattern of ribs formed on a base member in accordance with the invention;

FIG. 3 illustrates a modified grid pattern of ribs on a base member in accordance with the invention;

FIG. 4 illustrates a uniform pattern of circular ribs on a base member in accordance with the invention;

FIG. 5 illustrates a pattern of circular ribs and radiating ribs in accordance with the invention;

FIG. 6 illustrates a diagrammatic cross sectional view to an enlarged scale of an overlap zone taken on line VI—VI of FIG. 2;

FIG. 6a illustrates a diagrammatic view of a modified overlap zone in accordance with the invention; and FIG. 7 illustrates a diagrammatic view of an overlap zone taken on line VII—VII of FIG. 4.

Referring to FIG. 1, the rib 1 for a ribbed article is comprised of a plurality of weld seams 2 which are applied in overlying layers one upon another. As indicated, the width of the seams 2 decreases with increasing rib height from a rib base 3. This features simplifies production since any weld seam bears on a relatively wide base while material is saved without any sacrifice of strength. As illustrated, a pair of parallel guide beads 4 are formed on a base member 5 prior to formation of a rib 1. These beads 4 are spaced apart from one another at a spacing equal to the base width of the rib 1 and serve to guide and bear the first weld seam 2' of the rib 1. This ensures that the shape of the rib is maintained satisfactorily. In the complete rib 1, the beads 4 provide a satisfactory transition shapewise and materialwise from the rib 1 to the base member 5. The beads 4 being devoid of notching but preferrably having a slightly concaved surface.

Of note, the rib 1 can be wider than that indicated in FIG. 1. In this event, a number of weld seams can be applied one beside another per weld layer. The material used for the weld seams 2, 2' and beads 4 may be of the same material and may also be of different materials. Further, the materials from one seam to another may be of different materials in order to meet specific requirements of strength and/or corrosion protection. In practice, it has been found that if the seams 2 are applied carefully, the resulting surface texture of the rib 1 is satisfactory without further treatment. However, the rib can be smoothed if required. Further, the rib may also be covered with other weld material, for example, as corrosion protection.

Referring to FIG. 2, a ribbed article 20 may be comprised of a base member 5 and a pattern of ribs 101, 102 which are disposed in crossing relation to each other in grid-like manner to define recesses 6 of straight prismatic shape, for example of square shape. As indicated in FIG. 2, one parallel array of ribs 101 are shown as "vertical" ribs while the transverse array of ribs 102 are shown as "horizontal" ribs. As indicated, the ribs 101, 102 are disposed in overlapping relation in respective overlap zones 100.

Referring to FIG. 6, the two ribs 101, 102 which cross in an overlap zone 100 are formed in a way so that the overlap zone 100 is of equal height to the remainder of the ribs 101, 102 relative to the base member 5. As indicated, two weld seams 21 of a vertical rib 101 are disposed one above another while two weld seams 22 of a horizontal rib 102 are disposed one above another with each of the four seams applied continuously in the overlap zone. In addition, the corresponding crossing weld seams 22 of the horizontal rib 102 and the crossing weld seams 21 of the vertical rib 101 are applied discontinuously in the overlap zone. As indicated, an interrupted seam always covers a continuous seam in the overlap zone 100 to some extent so that the interconnected ribs in the zone 100 are of the same rib height for the same number of weld layers.

In practice, a tendency has been found for the ribs 101, 102 between two overlap zones 100 to shrink more towards the member 5 than is the case in the zones 100 themselves. However, the difference is very slight and can be corrected, if necessary, by the application of an additional and possibly thinner weld seam to every rib 101, 102 between every two adjacent overlay zones 100.

Another possibility is to apply continuously more than two consecutive weld seams 21, 22 of a rib 101, 102 or to apply to one another alternately a continuous weld seam 21 and a discontinuous weld seam 22 in any one rib 101, 102. Another possibility is to apply consecutively different numbers or continuous and discontinuous weld seams 21, 22 in a rib 101, 102, for example, two discontinous seams on three continuous seams then four continuous seams and one discontinuous seam. The optimal relationships must be determined in each individual case inter alia, in dependence upon the available equipment.

Referring to FIG. 6a, an overlap zone between two ribs which are disposed in perpendicular relation to one another may be formed in an alternative manner. In this case, two weld seams 21a, 22a of a bottom weld layer of the ribs 101a, 102a, respectively, so cross one another that both extend continuously through an overlap zone 100a. One weld seam 22a of a horizontal rib 102a rises above the weld seam 21a of a vertical rib 101a. In a top weld layer, both the seam 21a of the vertical rib 101a and the seam 22a of the horizontal rib 102a are discontinuous. Of note, additional weld layers may be applied in a similar fashion.

Referring to FIG. 3, the pattern of ribs may also be such as to define uniformly distributed recesses 7 in the form of hexagonal prisms. In this case, any three ribs 11 are interconnected in an overlap zone 110. No details of these zones 110 are shown since they are constructed in substantially the same manner as the overlap zones 100 of FIG. 2. Advantageously in every overlap zone 110 of every weld layer, a weld seam is applied continuously to two of the ribs 11 and is covered, to some extent, by another discontinuous weld seam from a third of the ribs 11. All the finished ribs have substantially the same number of weld layers with discontinuous weld seams.

Referring to FIG. 4, an article 40 may be formed with annular ribs 12 which are uniformly disposed on a base member 5 in order to define recesses 8 of cylindrical shape. Further, the ribs may be disposed so that each rib cooperates with an immediately adjacent rib to form an overlap zone 120. As shown in FIG. 7, the adjacent cylindrical ribs 12, 12' are interconnected so as to have the same average rib height 14 and the same number of weld layers.

Referring to FIG. 5, an article 50 may be formed of a base member 5 with a pattern of ribs wherein some of the ribs 131 are of circular shape to define concentrically disposed recesses while others of the ribs 132 are radially disposed relative to the circular ribs 131 in an overlapping crossing relation at respective overlap zones 130. Each overlap zone 130 is formed in the same manner as described above with respect to FIGS. 2, 6, and 6a, respectively. In this embodiment, where the article is produced, for example as a mirror support plate for a solar collector, it is important that the temperature throughout the article 50 be uniform during the build-up welding. To this end, a weld seam of the circular rib 131 having the greatest diameter is preferrably applied first. Thereafter, a weld seam of the annular rib 131 for the next largest diameter is applied and so on in sequence until a weld seam of the smallest annular rib has been applied. A weld seam is then applied for each radial rib 132 in sequence, for example clockwise, until weld material has been applied for all of the ribs 131, 132 to be formed. A second weld layer, which again starts from the largest diameter annular rib 131 is then applied and the sequence of seam application is retained until all the ribs 131, 132 are finished. If any weld layer of a rib 131, 132 comprises a number of adjacent weld seams, the entire layer of the rib is preferably finished before a changeover to the next rib. In this case also, the ribs bound open recesses 9.

The technique for applying the weld seams is well known under the "build-up arc welding method". However, the term "build-up arc welding method" is intended to cover any build-up or facing method involving the use of an arc between an electrode and the work piece being built-up, such as TIG, MIG and submerged welding.

The parent or base member may be flat or curved, for example, the base member may be cylindrical or may have any other shape. The ribs which are formed may also have a wide variety of cross-sectional and longitudinal shapes and the rib height may vary along the length of the rib.

Preferably, during production of an article, the article and the electrode are moved relative to one another so that the weld material is always applied with the weld seam horizontal, i.e. in a trough position. Further, the electrode may be a rocking electrode.

The invention thus provides a ribbed article formed of built-up ribs in which inhomogeneities of the ribs is avoided.

The invention also provides a ribbed article which is relatively simple and inexpensive to produce but which is very strong.

The invention also provides a relatively simple method for building up a ribbed pattern on a base member for strengthening purposes.

What is claimed is:

1. A ribbed article comprising
a base member; and
a plurality of ribs disposed on said base member with at least two of said ribs disposed in overlapping relation in an overlap zone and being formed of an equal number of multiple layers of weld seams, at least one weld seam in one of said two ribs extending continuously through said overlap zone and at least one weld seam in the second of said two ribs being interrupted in said overlap zone whereby said overlap zone is of equal height to the remainder of said two ribs relative to said base member.

2. A ribbed article as set forth in claim 1 wherein said ribs are disposed in crossing relation to each other in grid-like manner to define recesses of straight prismatic shape.

3. A ribbed article as set forth in claim 1 wherein said ribs are uniformly disposed on said base member and define recesses of cylindrical shape.

4. A ribbed article as set forth in claim 1 wherein some of said ribs are of circular shape to define concentrically disposed recesses and others of said ribs are radially disposed relative to said circular ribs and in overlapping relation.

* * * * *

UNITED STATES PATENT AND TRADEMARK OFFICE
CERTIFICATE OF CORRECTION

PATENT NO. : 4,731,280

DATED : March 15, 1988

INVENTOR(S) : Max Geisseler

It is certified that error appears in the above-identified patent and that said Letters Patent is hereby corrected as shown below:

```
Column 1, line 44 "zon" should be -zone-
Column 2, line 42 "company" should be -companying-
Column 2, line 64 "features" should be -feature-
Column 3, line 7  "being" should be -are-
Column 3, line 8  "having" should be -have-
Column 3, line 8  "preferrablv" should be -preferably- Column 4, line 47 "preferrably" should be -preferably-
Column 4, line 59 "preferrably" should be -preferably-
Column 5, line 7  "preferrably" should be -preferably-
```

Signed and Sealed this

Eleventh Day of October, 1988

*Attest:*

DONALD J. QUIGG

*Attesting Officer*  *Commissioner of Patents and Trademarks*